(No Model.)
H. D. TAGGART.
APPLIANCE FOR ASSISTING ANATOMICAL ORGANS.
No. 594,815. Patented Nov. 30, 1897.
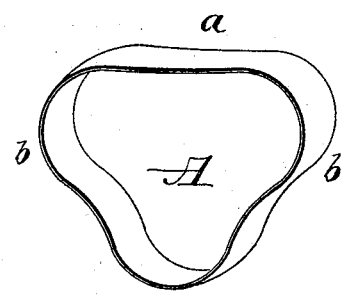
Witnesses
G. F. Downing
H. W. Foster
Inventor
H. D. Taggart
By J. G. Nottingham
Attorney

UNITED STATES PATENT OFFICE.

HORACE D. TAGGART, OF AKRON, OHIO.

APPLIANCE FOR ASSISTING ANATOMICAL ORGANS.

SPECIFICATION forming part of Letters Patent No. 594,815, dated November 30, 1897.

Application filed January 12, 1895. Serial No. 534,689. (No model.) Patented in Belgium May 21, 1895, No. 115,705; in France May 21, 1895, No. 247,611, and in Canada June 23, 1896, No. 52,728.

*To all whom it may concern:*

Be it known that I, HORACE D. TAGGART, of Akron, in the county of Summit and State of Ohio, have invented certain new and useful Improvements in Appliances for Assisting Anatomical Organs in the Natural Performance of their Functions, (for which I have obtained Patents in Canada, No. 52,728, dated June 23, 1896; in Belgium, No. 115,705, dated May 21, 1895, and in France, No. 247,611, dated May 21, 1895;) and I do hereby declare the following to be a full, clear, and exact description of the invention, such as will enable others skilled in the art to which it appertains to make and use the same.

My invention relates to an improvement in appliances for assisting anatomical organs in the natural performance of their functions, the object of the invention being to produce a simple and efficient device for use on the male generative organ during sexual intercourse and adapted to produce elastic compression of the dorsal vein when the generative organs shall have become so inactive as to refuse to perform their natural duties.

With this object in view the invention consists in certain novel features of construction, as hereinafter set forth, and pointed out in the claims.

The accompanying drawing is a view of the appliance.

It is not of unfrequent occurrence that the male generative organs become inactive or incapacitated from some remediable cause and fail to perform their office. This state of the organs, being abnormal or unnatural, constitutes, in effect, a disease or ailment which it is the design of my invention to remedy or counteract, and this I propose to accomplish by providing a device (A in the drawing) made, preferably, of hard rubber or of metal having the proper elasticity, covered or not with soft elastic material and of a shape to conform to the contour of the extended generative organ or penis at or near the junction of the branches of the dorsal vein. The general shape of the device is preferably triangular, the upper flat portion $a$ being intended to lie upon the dorsal vein, and the convergent sides $b$ will preferably be made to meet at their lower ends and form the apex of the triangle, which latter I prefer to make curved, especially at and near the apex, so as not to injure or compress the urethra. The lateral distention of the corpora cavernosa, which bear against the sides $b$ of the device, will cause the top or upper portion $a$ to descend or become slightly curved and bear with a yielding pressure upon the large dorsal vein in proportion to the degree of such lateral distention, thus fully (but only normally) distending the corpus spongiosum, glands, and incidentally the entire organ without compressing the urethra and all portions of the organ lying beneath the corpora cavernosa, which should not be artificially compressed.

It will be seen that by the use of my improved device the venous circulation, particularly in the dorsal vein or veins, is slowed, and the glands, corpus spongiosum, and incidentally the entire organ will be distended with blood to a normal degree, causing neither anesthesia, blood stasis, nor other undesirable conditions. The natural activity of the organ will thus be revived without injurious effects to either the male or the female and without violating any law of morality or public policy.

The device is used only by a person having incapacitated generative organs during sexual intercourse and could not be of use at other times.

The device may be made of other materials than those above mentioned and may be made partly rigid and partly elastic.

My improved device automatically congests the penis only at such time as when there exists a distention (or erection) of the organ, more or less feebly or imperfectly, by descending upon the top of the organ with a degree of force proportionate to the amount of distention (or expansion) of the corpora cavernosa, (particularly lateral expansion.) The automatic elastic pressure caused by the dipping (or bending) of the base of the triangle is of some importance, but of secondary importance only, as the top might be rigid with or without soft or elastic material attached where it bears on top of organ, but the top may, if desired, be of soft material or of elastic metal covered with soft material.

The expanding of the corpora cavernosa serves to lift the device in a general lateral direction from contact with or pressure against the under parts of the organ (corpus spongiosum) in proportion to such expansion.

Adjustability is attained by making the lateral portions of the device of sufficient length to accommodate any individual safely.

Having fully described my invention, what I claim as new, and desire to secure by Letters Patent, is—

1. An appliance for assisting the male generative organ in the natural performance of its functions, consisting of a triangular device having yielding portions, one of said yielding portions being adapted to press the dorsal vein.

2. An appliance for assisting the male generative organ in the natural performance of its functions, consisting of a device having yielding portions and a portion to receive the urethra without contracting it, one of said yielding portions being adapted to extend over and press the dorsal vein and the other yielding portions being adapted to bear against the corpora cavernosa.

3. As an article of manufacture an appliance for assisting anatomical organs in the performance of their functions, the same consisting of three members connected together in one piece, the sides thereof extending inward from a straight line between their ends to compress the organ at the sides without constricting the urethra, substantially as set forth.

HORACE D. TAGGART.

Witnesses:
A. F. BARTGEZ,
J. J. HALL.